United States Patent
Connor

[11] Patent Number: 6,012,500
[45] Date of Patent: Jan. 11, 2000

[54] SECOND STAGE TIRE BUILDING MACHINE UTILIZING BLADDERLESS FORMER SLEEVE

[75] Inventor: Thomas M. Connor, Wilson, N.C.

[73] Assignee: Bridgestone/Firestone, Inc., Akron, Ohio

[21] Appl. No.: 09/012,251

[22] Filed: Jan. 23, 1998

[51] Int. Cl.[7] .................................................. B29D 30/26
[52] U.S. Cl. .......................... 156/398; 156/135; 156/415
[58] Field of Search .................... 156/132, 131, 156/135, 398, 403, 414, 415, 416

[56] References Cited

U.S. PATENT DOCUMENTS

| | | | |
|---|---|---|---|
| 3,402,090 | 9/1968 | Henley | 156/398 |
| 4,229,246 | 10/1980 | Vanderzee | 156/403 |
| 4,325,764 | 4/1982 | Appleby et al. | 156/398 |
| 4,402,783 | 9/1983 | Enders | 156/415 |
| 4,472,233 | 9/1984 | Fukamachi et al. | 156/415 |
| 5,254,204 | 10/1993 | Miyanaga et al. | 156/415 |
| 5,268,057 | 12/1993 | Nojiri et al. | 156/415 |

*Primary Examiner*—Geoffrey L. Knable
*Attorney, Agent, or Firm*—John M. Vasuta; Michael Sand

[57] ABSTRACT

A bladderless former sleeve (100) is disclosed for a bladderless second stage tire building machine (102) having at least one bead lock assembly (116), the bead lock assembly (116) having an annular clamp (114) with an annular groove (112). The sleeve (100) includes an annular main body (104) having first (106) and second (108) ends, the main body (104) having a thickness. A bead (110) is attached to the annular main body (104) at the first end (106). The bead (110) has a thickness substantially greater than the thickness of the main body (104) at the second end (108). The bead (110) is sized to fit snugly within the groove (112) of the clamp (114). The main body (104) of the sleeve (100) is sized to substantially cover the bead lock assembly (116) or at least the bead lock shoes (120) of the machine (102) during operation of the machine when the bead lock shoes (120) are in a fully expanded position.

12 Claims, 5 Drawing Sheets

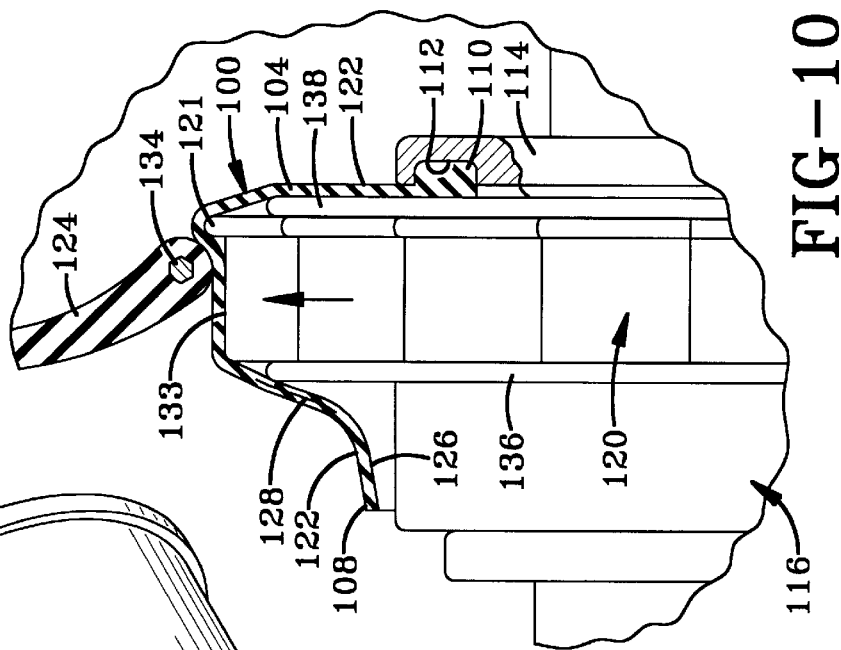
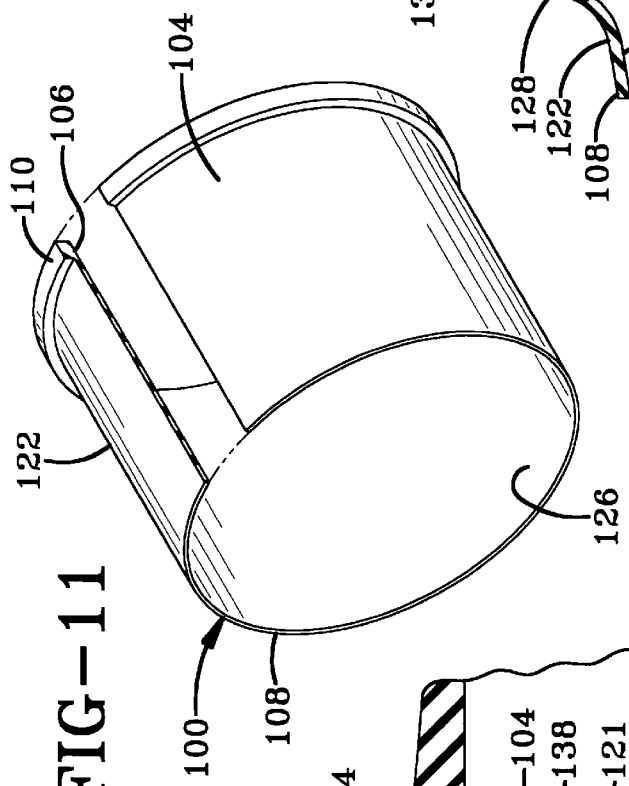
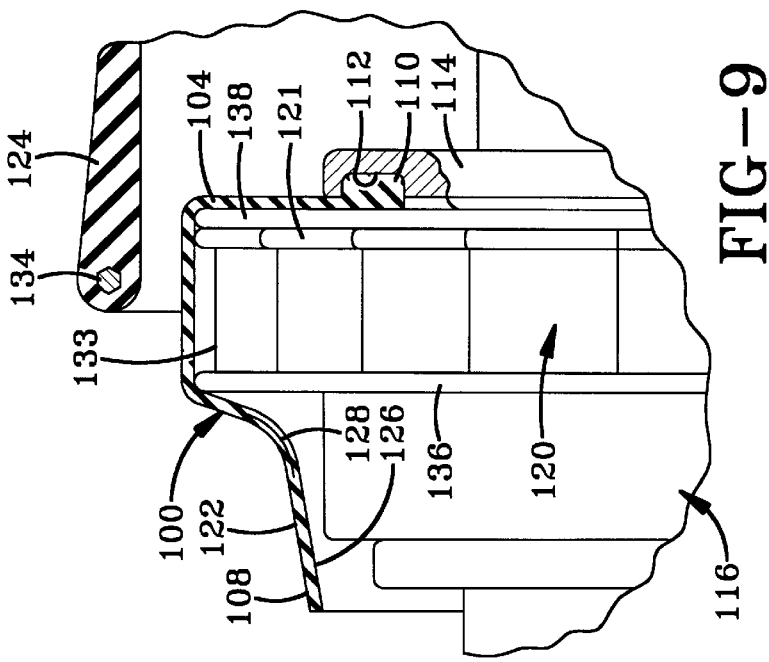

SECOND STAGE TIRE BUILDING MACHINE UTILIZING BLADDERLESS FORMER SLEEVE

BACKGROUND OF THE INVENTION

1. Technical Field

This invention relates generally to second stage tire building machines and, more particularly, to a bladderless second stage tire building machine. Specifically, the present invention relates to a former sleeve for a bladderless second stage tire building machine that is held in position by the existing clamps and substantially encloses the expandable bead lock shoes such that the sleeve is clamped between the shoes and a tire carcass to form a strong and reliable seal.

2. Background Information

In a two-stage tire building operation, a substantially cylindrical tire carcass is first built by a carcass former. Thereafter, the carcass is dismounted from the carcass former and transferred and mounted on a second stage tire building machine. The second stage tire building machine expands the tire carcass into a rough tire shape such that it may be mated with a tread package.

The tire carcass is expanded by sealing its outer edges and filling its interior with pressurized air. The pressurized air causes the body of the tire carcass to expand outwardly while the second stage tire building machine pushes the edges of the tire carcass inwardly so that a rough tire shape is formed. The tread package is mated with the outer surface of the tire carcass while the pressurized air holds the shape of the carcass. The carcass and tread package may then be rotated to allow for bonding and stitching of the different layers.

One type of second stage tire building machine known in the art utilizes a bladder disposed between two bead lock assemblies to provide the required expansive force. An example of this type of machine is depicted in FIGS. 1 and 2. Although functional, the second stage tire building machine utilizing the air bladder has certain disadvantages given the expense of providing the bladder which must be replaced as it is repeatedly used. Such disadvantages led the industry to develop a bladderless second stage tire building machine.

One embodiment of a bladderless second stage tire building machine known in the prior art is schematically depicted in FIGS. 3 and 4 of the present specification. The bladderless machine includes a pair of bead lock assemblies movably carried on a main shaft. As can be seen in FIGS. 3 and 4, the bladder of FIGS. 1 and 2 is absent. Instead, the seal is created by a pair of flexible, annular seals that are held at one end by the existing clamp and at the other end by a clamping groove formed in each of the bead lock shoes of the bead lock assemblies. The clamping arrangement may be seen in FIGS. 5 and 6 of the present specification. This arrangement is functional although the seal is relatively thin between the area of high pressure inside the tire carcass and the external atmosphere. Furthermore, the cost of retrofitting a machine using a bladder with the bladderless bead lock shoes is undesirably high.

In view of the foregoing, it is clear that there is a need in the art to provide a bladderless former sleeve for a second stage tire building machine that creates a strong and reliable seal during tire carcass expansion while providing a configuration that allows for relatively easy and inexpensive retrofitting. It is further desirable that the bladderless former sleeve is able to be installed on a second stage tire building machine without requiring the machine to be modified structurally.

SUMMARY OF THE INVENTION

In view of the foregoing, the primary objective of the present invention is to provide a bladderless former sleeve for a second stage tire building machine.

Another objective of the present invention is to provide a bladderless former sleeve for a second stage tire building machine that may be retrofitted onto a tire building machine having a bladder without requiring any modification of the structure of the existing tie building machine.

Still another objective of the present invention is to provide a bladderless former sleeve for a second stage tire building machine that provides a strong and reliable seal between the expandable bead lock assemblies of the machine and the tire carcass during expansion of the tire carcass.

Yet another objective of the present invention is to provide a bladderless former sleeve for a second stage tire building machine that may be connected to the machine by the existing clamps of the machine.

A further objective of the present invention is to provide a bladderless second stage tire building machine utilizing the bladderless former sleeves of the present invention.

Still a further objective of the present invention is to provide a bladderless former sleeve for a second stage tire building machine that is of simple construction, which achieves the stated objectives in a simple, effective, and inexpensive manner, and which solves problems and satisfies the needs existing in the art.

These and other objectives and advantages are obtained by the bladderless former sleeve of the present invention, the general nature of which may be stated as including an annular main body having first and second ends, the main body having a thickness; a bead attached to the main body at the first end; the bead having a thickness substantially greater than the thickness of the main body at the second end; and the bead being sized to fit snugly within the groove of a clamp present on an existing second stage tire building machine.

BRIEF DESCRIPTION OF THE DRAWINGS

The preferred embodiment of the invention, illustrative of the best mode in which the applicant has contemplated applying the principles of the invention, is set forth in the following description and is shown in the drawings and is particularly and distinctly pointed out and set forth in the appended claims.

FIG. 9 is an enlarged fragmentary view with portions in section of the bladder former sleeve of the invention mounted on the bead lock assembly which is shown in retracted position;

FIG. 10 is a view similar to FIG. 9 showing the bladder former sleeve in sealing engagement with the tire carcass upon outward expansion of the bead lock assembly; and FIG. 11 is a diagrammatic perspective view with portions broken away and in section of the bladder former sleeve of the present invention.

Similar numerals refer to similar parts throughout the drawings.

DESCRIPTION OF THE PREFERRED EMBODIMENT

Figure 1:
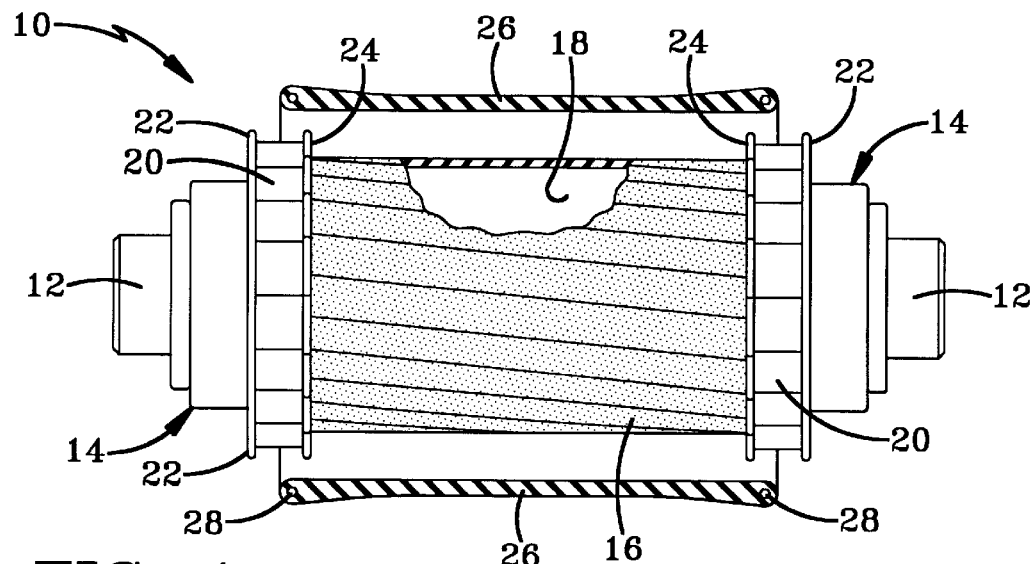
FIG. 1 is a diagrammatic view of a second stage tire building machine using an inflatable tire forming bladder with the tire carcass being in position prior to inflation of the bladder and outward expansion of the bead lock assembly.
Figure 2:
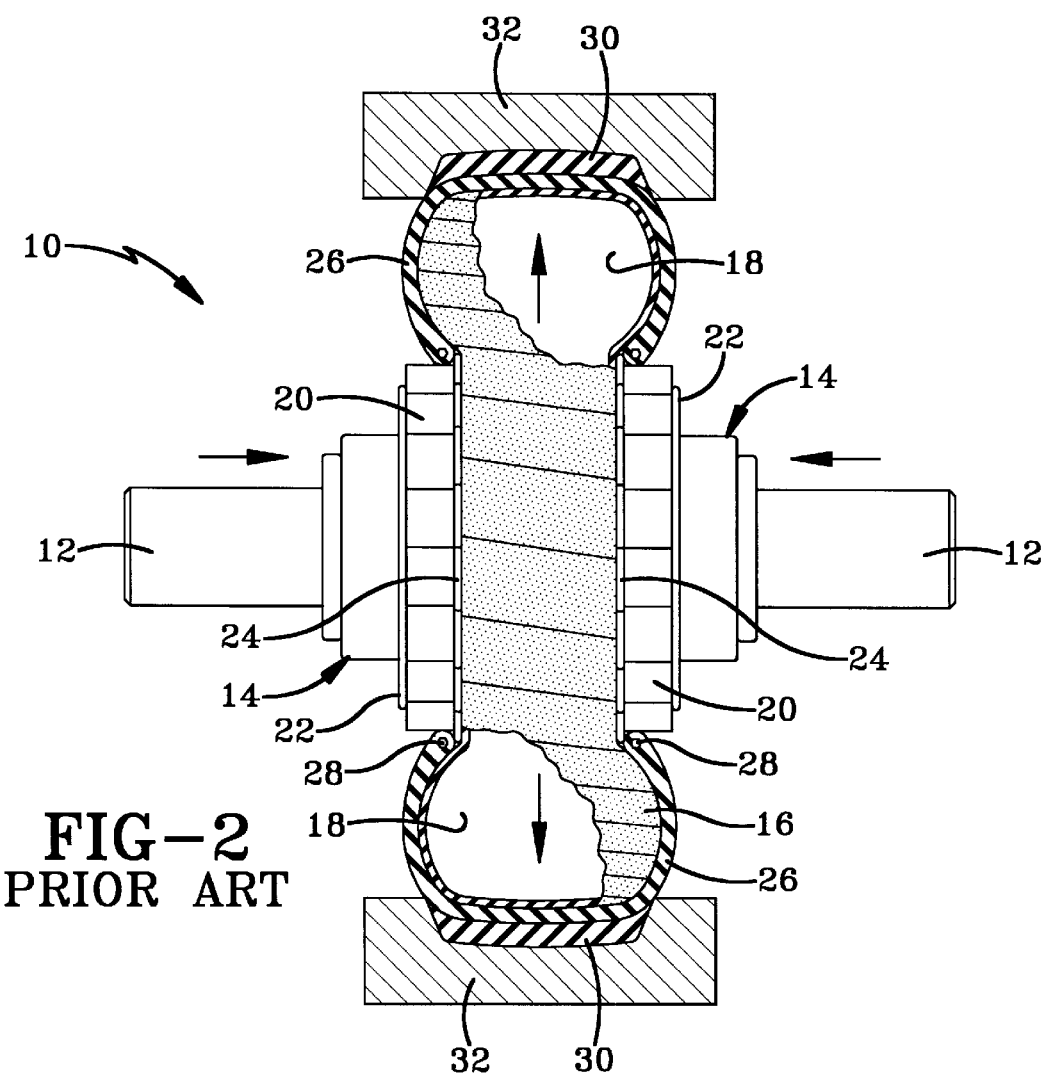
FIG. 2 is a diagrammatic view similar to FIG. 1 showing the bladder and the bead lock assembly expanded outwardly with a tread package being mated with the carcass in a usual tire forming operation.

In order to provide a background for the description of the present invention which follows below, a second stage tire building machine utilizing a bladder is depicted in FIGS. 1 and 2 and is indicated generally by the numeral 10. Machine 10 includes a main shaft 12 which has therein a supply line connected to a source of pressurized air (not shown). Machine 10 further includes a pair of opposingly disposed, expandable bead lock assemblies 14. Bead lock assemblies 14 are movably carried on main shaft 12 such that they may be moved axially between a first position depicted in FIG. 1 and a second position depicted in FIG. 2. A bladder 16 extends between each of expandable bead lock assemblies 14 to form a substantially sealed chamber 18 bounded by bladder 16 and bead lock assemblies 14. Chamber 18 may be filled with pressurized air from the source described above.

Each expandable bead lock assembly 14 includes a plurality of expandable bead lock shoes 20 which are moved radially between retracted and expanded positions, the retracted position being depicted in FIG. 1 while the expanded position is depicted in FIG. 2. Bead lock shoes 20 are bounded by an outboard ring 22 and an inboard ring 24.

As may be seen in FIG. 1, bead lock assemblies 14 have a maximum diameter substantially smaller than the minimum inner diameter of a tire carcass 26 such that tire carcass 26 may be slid over machine 10 when bead lock assemblies 14 are in the first position and bead lock shoes are in the retracted position. Once tire carcass 26 is positioned over machine 10 such that its bead rings 28 are disposed over bead lock shoes 20 between outboard 22 and inboard 24 rings, bead lock shoes 20 may be expanded radially outwardly to the expanded position to engage tire carcass 26 at bead rings 28.

After bead lock shoes 20 are expanded to engage tire carcass 26, chamber 18 is filled with pressurized air and bead lock assemblies 14 are moved toward each other until machine 10 is in the configuration depicted in FIG. 2. In this position, a tread package 30 is positioned adjacent the outer wall of tire carcass 26 by another machine 32. Tread package 30 and tire carcass 26 are thus joined while bladder 16 provides an expansive force to tire carcass 26.

After tread package 30 and tire carcass 26 are joined, bladder 16 is deflated and bead lock assemblies 14 are moved back to the first position depicted in FIG. 1. The process of repeatedly inflating and deflating bladder 16 causes bladder 16 to wear requiring it to be replaced after a given number of cycles. Another problem is that bladder 16 is deformed when the combination tread package 30 and tire carcass 26 are removed from machine 10. This deformation also causes bladder 16 to wear and increases the cycle time of machine 10.

The disadvantages of second stage tire building machine 10 that included bladder 16 depicted in FIGS. 1 and 2 led to the invention of a bladderless second stage tire forming machine which is depicted in FIGS. 3–6 and indicated generally by the numeral 50. Machine 50 is similar to machine 10 in that machine 50 also includes a main shaft 12 that allows pressurized air to be directed between a pair of bead lock assemblies 54. As discussed above with respect to machine 10, bead lock assemblies 54 movably carried on shaft 12 between a first position depicted in FIG. 3 and a second position depicted in FIG. 4. Each bead lock assembly 54 includes a plurality of bead lock shoes 56 having a tire bead outer clamping surface 56a disposed between an outboard ring 58 and an inboard ring 60. Each bead lock assembly 54 further includes an annular clamp 62 having an annular groove 64 disposed adjacent the outer radial surface of clamp 62.

Figure 6:
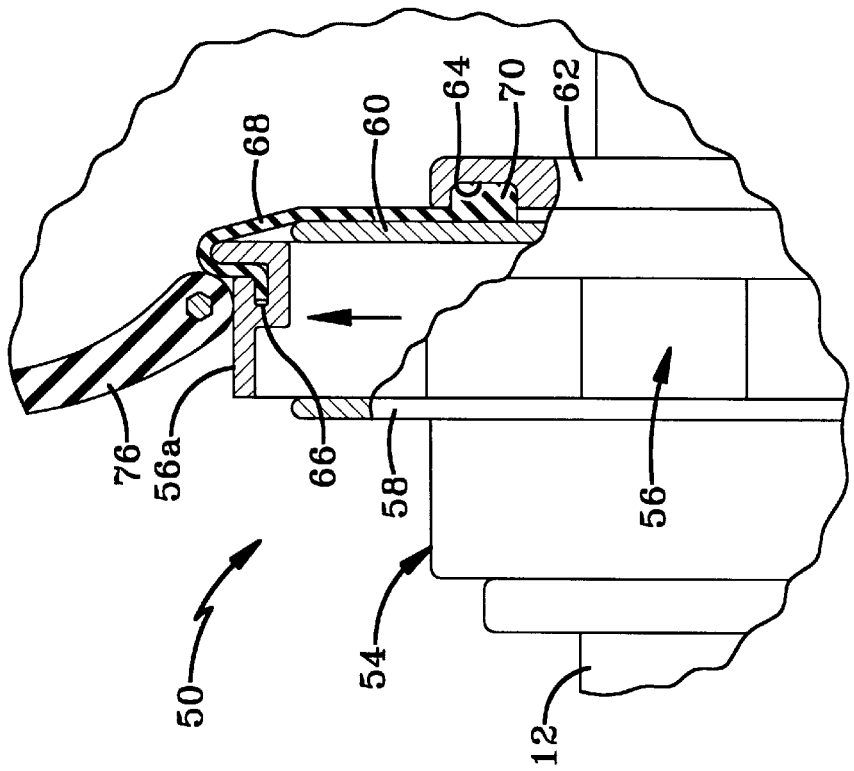
FIG. 6 is a view similar to FIG. 5 of the prior art bladderless former sleeve in an expanded position with the tire carcass.
Figure 5:
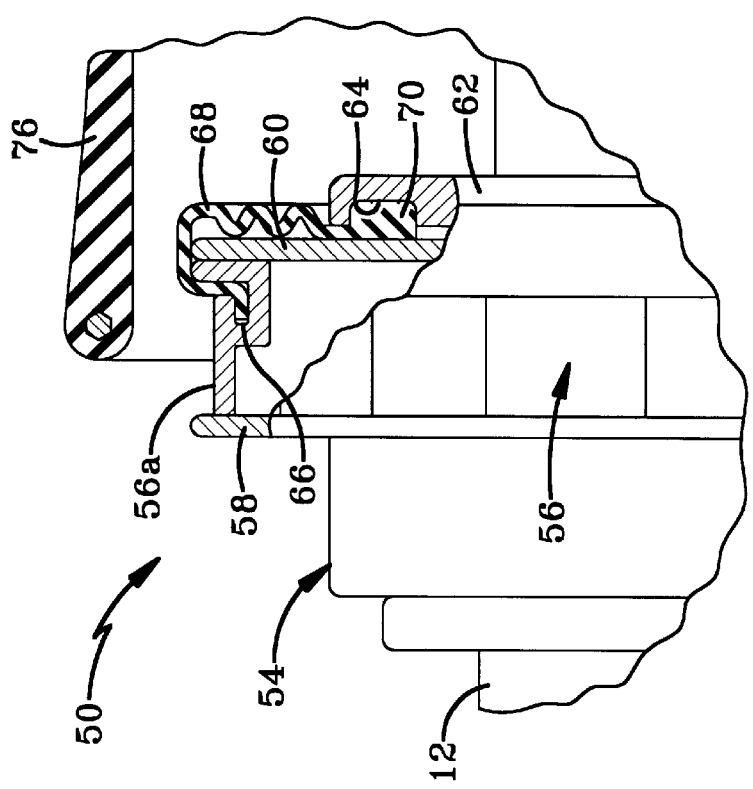
FIG. 5 is an enlarged fragmentary view with portions in section, of the prior art bladderless former sleeve of FIGS. 3 and 4 mounted on the bead lock assembly in retracted position.

As may be perhaps best seen in FIGS. 5 and 6, each bead lock shoe 56 is provided with a clamping groove 66 in its outer surface. It may thus be understood that significant expense is required to modify machine 10 to work without bladder 16 by retrofitting each machine 10 with a plurality of specially built bead lock shoes 56 having the clamping groove 66. Furthermore, the versatility of machine 50 is limited by seals 68 as the range of tire sizes useable with machine 50 is reduced by seals 68.

Machine 50 functions by providing a flexible, annular seal 68 disposed between clamp 62 and bead lock shoes 56. Seal 68 includes a bead 70 at one end that is held in annular groove 64 of clamp 62. The other end of seal 68 is held in clamping groove 66 of bead lock shoes 56.

Figure 3:
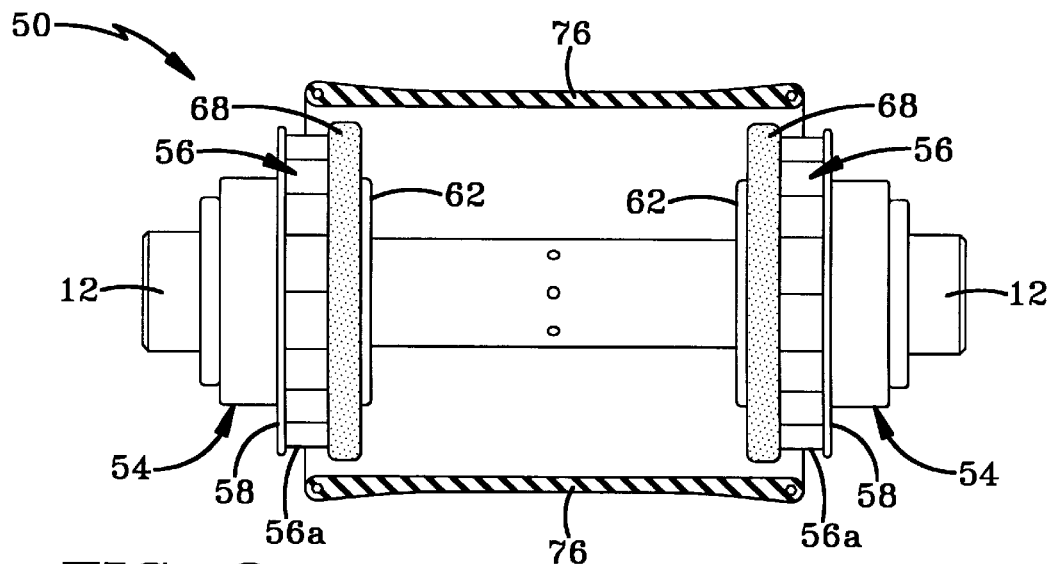
FIG. 3 is a diagrammatic view similar to FIG. 1 of a second stage tire forming machine using a prior art bladderless former sleeve.
Figure 4:
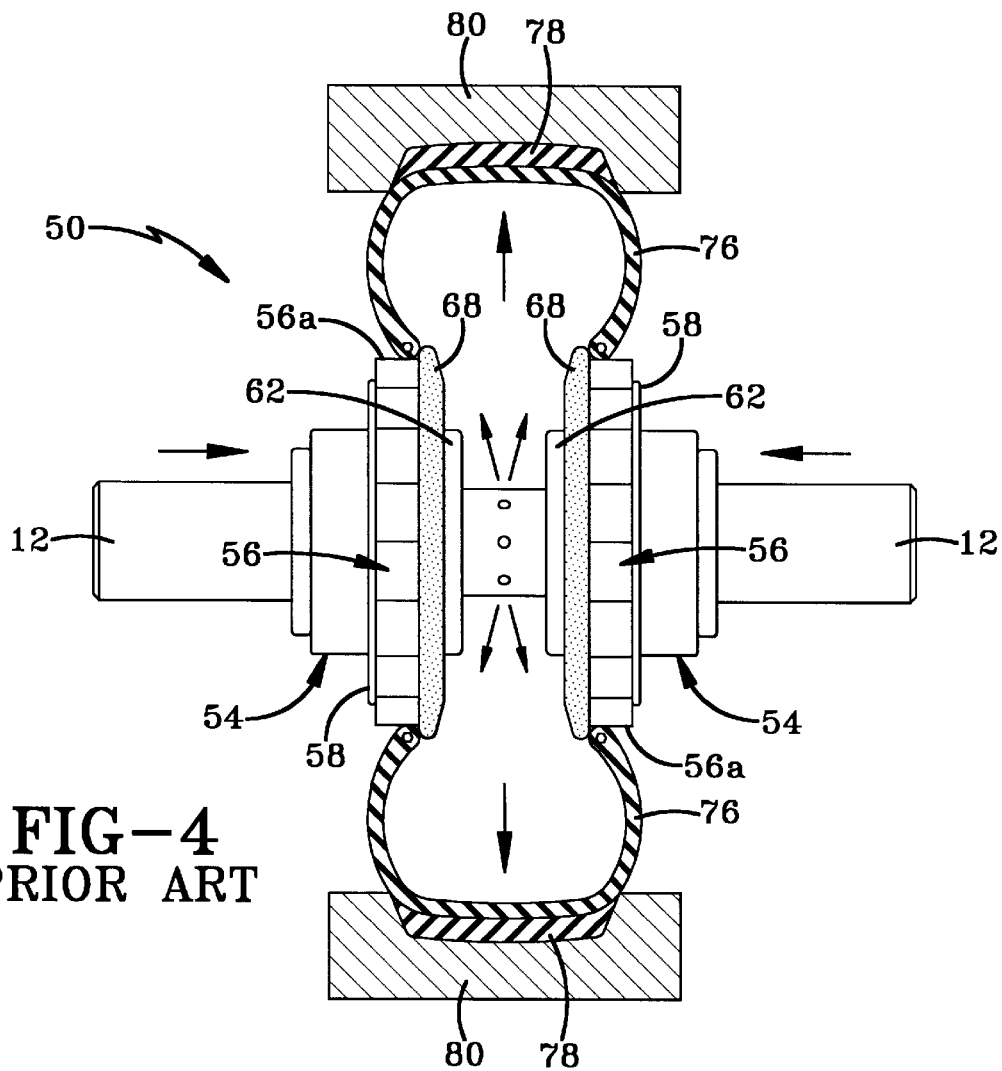
FIG. 4 is a diagrammatic view similar to FIG. 2 showing the prior art bladderless former sleeve of FIG. 3 in sealing engagement with the tire carcass as it is expanded outwardly into mating engagement with the tread package.

As shown in FIG. 3, machine 50 has a maximum outer diameter when bead lock assemblies 54 are in the first position that is substantially less than the minimum inner diameter of a tire carcass 76 such that tire carcass 76 may be slid over machine 50. When tire carcass 76 is positioned such that its ends are aligned with bead lock shoes 56, bead lock shoes 56 are expanded to engage tire carcass 76. Pressurized air is then supplied to the interior of tire carcass 76 and bead lock assemblies 54 are moved together to the second position as depicted in FIG. 4. The interior of tire carcass 76 is substantially sealed because the end of tire carcass 76 contacts seal 68 are depicted in FIG. 6. As discussed above, a tread package 78 is then brought in by another machine 80 and is joined to tire carcass 76 by appropriate means.

Although machine 50 avoids the disadvantages of machine 10 regarding bladder 16, the cost of modifying all of bead lock shoes 56 to include clamping groove 66 is prohibitive. The versatility of machine 50 is also reduced. Furthermore, the seal provided between tire carcass 76 and seal 68 is not as strong and reliable as the seal provided by bladder 16 of machine 10.

Figure 7:
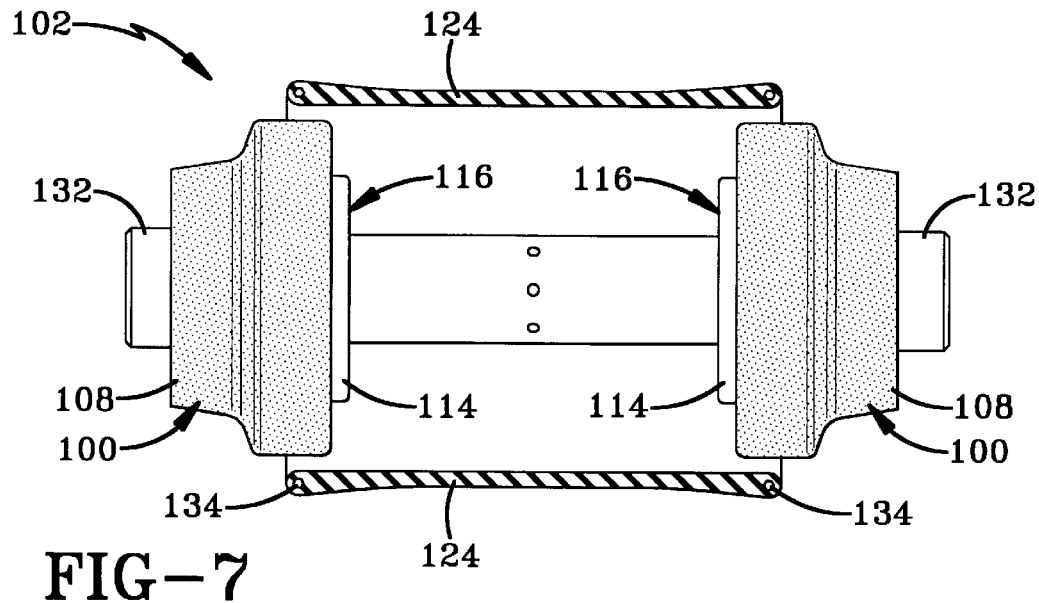
FIG. 7 is a diagrammatic view similar to FIGS. 1 and 3 showing the bladderless former sleeve of the present invention mounted on a second stage tire forming machine with the tire carcass shown in section in position on the tire building machine prior to expansion of the bead lock assembly.
Figure 8:
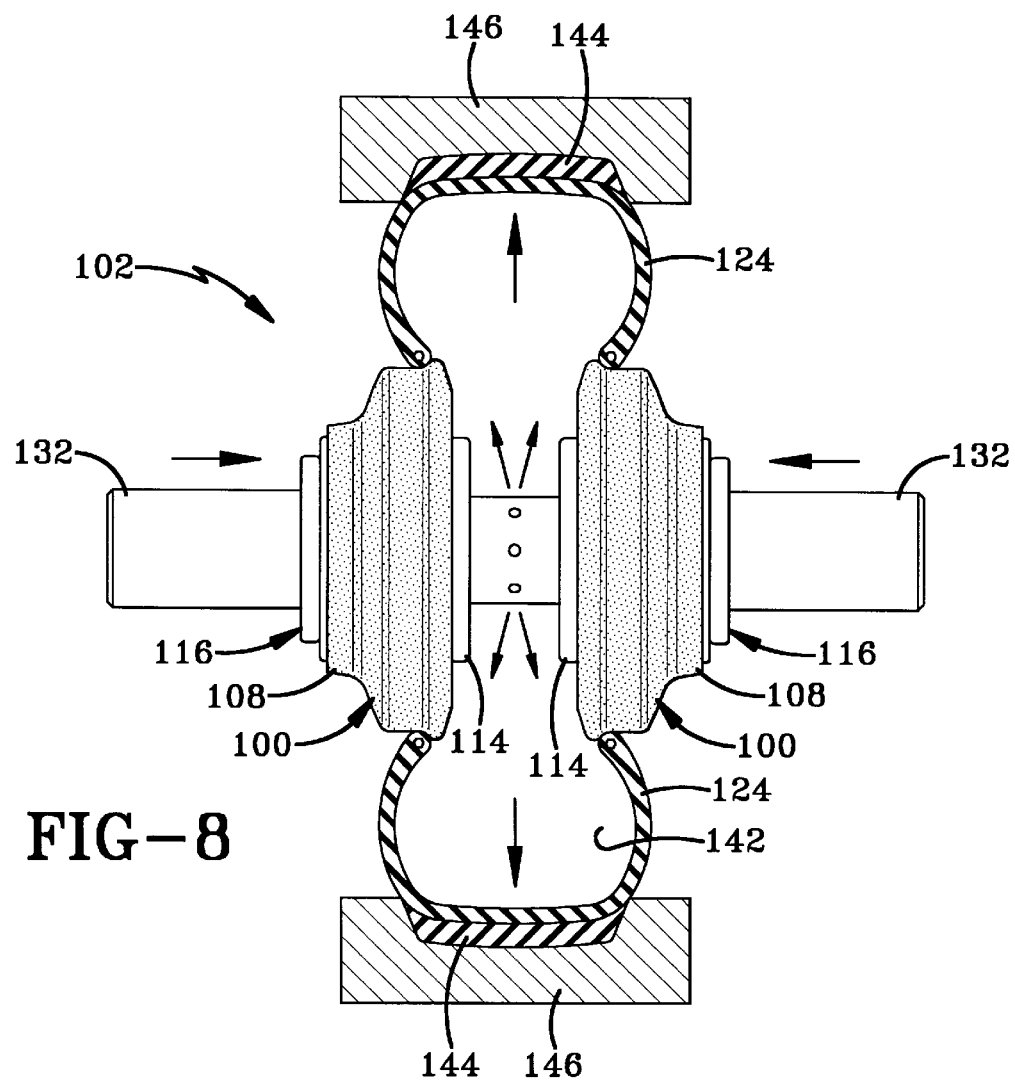
FIG. 8 is a view similar to FIG. 7 showing the bladderless former sleeve in position during the forming of the tire carcass and its mating engagement with the tread package.

A bladderless second stage tire building machine utilizing bladderless former sleeves 100 of the present invention is depicted in FIGS. 7 and 8 and is indicated generally by the numeral 102. In accordance with one of the main objectives of the present invention, bladderless former sleeve 100 includes a substantially annular main body 104 having a first end 106 and a second end 108. Main body 104 is fabricated from an elastomeric material such that it is generally flexible but does not easily tear. Main body 104 has a substantially even thickness throughout its longitudinal length except that first end 106 is substantially thicker than main body 104. First end 106 is in the form of a bead 110 that is sized and shaped to fit snugly within an annular groove 112 of a clamp 114 of a bead lock assembly 116.

As depicted in the drawings, sleeve 100 has a longitudinal length that is sized such that sleeve 100 extends from clamp 114 entirely over bead lock assembly 116. In other embodiments of the present invention, sleeve 100 has a longitudinal length that is sized so that sleeve 100 only substantially covers bead lock shoes 120 when bead lock shoes are in either the fully retracted position depicted in FIG. 9 or the fully expanded position depicted in FIG. 10. Sleeve 100 also has a first surface 122 which contacts the tire carcass 124 and a second surface 126 which contacts bead lock shoes 120. Reinforcing members or cords 128 may be embedded in sleeve 100.

As may be seen in FIG. 7, second stage tire building machine 102 includes a pair of bead lock assemblies 116 opposingly disposed on a main shaft 132. In accordance with another objective of the present invention, each bead lock assembly 116 includes a sleeve 100 attached thereto by clamp 114. Sleeve 100 extends from clamp 114 back over inboard ring 138 and across outwardly extending end flanges 121 formed on bead shoes 120 and then across the curved outer tire bead clamping surfaces 133 and over outboard ring 136 of bead lock shoes 120 to the outer portion of bead lock assemblies 116. Second end 108 of sleeve 100 is not held by any mechanism and is said to be a loose end. Machine 102 thus accomplishes another objective of the present invention as machine 10 of FIGS. 1 and 2 may be inexpensively modified to become machine 102 by removing bladder 16 and installing sleeves 100.

Machine 102 has a maximum outer diameter that is substantially less than the minimum inner diameter of tire carcass 124 when machine 102 is in the position depicted in FIG. 7. As such, tire carcass 124 may be loaded onto machine 102 to the position depicted in FIG. 7. In this position, the ends of tire carcass 124 having bead rings 134 are disposed about bead lock shoes 120 between an outboard ring 136 and an inboard ring 138. After tire carcass 124 has been loaded into this position, bead lock shoes 120 are expanded from their retracted position depicted in FIG. 9 to their expanded position depicted in FIG. 10. When this occurs, main body 104 of sleeve 100 is clamped between bead lock shoes 120 and tire carcass 124 as depicted in FIG. 10. This clamping provides a strong and reliable seal between the pressurized interior 142 of tire carcass 124 and the outside atmosphere. Pressurized air is then directed into the interior of tire carcass 124 to expand it. While tire carcass 124 is expanded by the pressurized air, a tread package 144 may be attached to tire carcass 124 by an appropriate machine 146.

It may thus be understood that machine 102 does not require modification of bead lock shoes 120 to function without a bladder. This objective is achieved by bladderless former sleeve 100 which is securely retained to bead lock assembly 116 by clamp 114 and extends substantially over bead lock assembly 116 during the operation of machine 102. Use of sleeve 100 also does not limit the versatility of machine 102 as it may still be used with the same tire sizes and diameters as machine 10 disclosed in FIGS. 1 and 2.

Accordingly, the improved bladderless former sleeve is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved bladderless former sleeve is constructed and used, the characteristics of the construction, and the advantageous, new and useful results obtained, the new and useful structures, devices, elements, arrangements, parts and combinations, are set forth in the appended claims.

What is claimed is:

1. A bladderless second stage tire building machine, comprising:

a main shaft;

first and second bead lock assemblies, each of said bead lock assemblies including a clamp and a plurality of expandable bead lock shoes, said expandable bead lock shoes movable between retracted and expanded positions;

said first and second bead lock assemblies selectively movable between first and second positions, said second position being inward of said first position; said bead lock assemblies closer to each other in said second position than when in said first position;

said second stage tire building machine being free of a bladder extending between the first and second bead lock assemblies;

a bladderless former sleeve disposed over each of said bead lock assemblies;

said bladderless former sleeve including an annular main body having first and second ends, said main body disposed over said expandable bead lock shoes with said first end held in said clamp and said second end being loose.

2. A bladderless second stage tire building machine according to claim 1 wherein the first end of each of said sleeves is substantially thicker than the second end.

3. A bladderless second stage tire building machine according to claim 1 wherein each of the sleeves is substantially flexible and is formed of an elastomeric material.

4. A bladderless second stage tire building machine according to claim 3 wherein each of the sleeves has a longitudinal length, said length of said sleeves sized such that the sleeves substantially surround said expandable bead lock shoes in both of the retracted and expanded positions and extend outboard of the bead lock shoes.

5. A bladderless second stage tire building machine according to claim 1 wherein each of the clamps has an annular groove.

6. A bladderless second stage tire building machine according to claim 5 wherein each of the sleeves includes an annular bead formed at the first end of the sleeve, said beads being received in the grooves of the clamps.

7. In combination, a bladderless second stage tire building machine and a tire carcass;

said second stage tire building machine, comprising a main shaft; first and second bead lock assemblies, each of said bead lock assemblies including an inboard clamp and a plurality of expandable bead lock shoes, said expandable bead lock shoes movable between retracted and expanded positions; and a bladderless former sleeve disposed over each of said bead lock assemblies; said bladderless former sleeve including an annular main body having first and second ends, said main body disposed over said expandable bead lock shoes;

each of said bead lock assemblies being free of an outboard clamp;

said first and second bead lock assemblies selectively movable between first and second positions, said second position being inward of said first position; said bead lock assemblies closer to each other in said second position than when in said first position;

said second stage tire building machine being free of a bladder extending between the first and second bead lock assemblies;

said tire carcass having a pair of annular bead ring ends;

said main bodies of said sleeves being clamped between said bead ring ends and said expandable bead lock shoes when said bead lock shoes are in said expanded position; and said second end of said sleeve being loose.

8. The combination according to claim 7 wherein the first end of each of the former sleeves is held in the clamp of a respective one of the bead lock assemblies.

9. The combination according to claim 8 wherein said sleeve is substantially flexible.

10. The combination according to claim 9 wherein each of the sleeves has a longitudinal length, said length of said sleeves sized such that said sleeves substantially surround the expandable bead lock shoes in both of the retracted and expanded positions.

11. The combination according to claim 8 wherein each of the clamps has an annular groove.

12. The combination according to claim 11 wherein each of the sleeves includes an annular bead formed adjacent the first end of said sleeve, said bead being received in the groove of a respective one of the clamps.

* * * * *